United States Patent [19]

Lear

[11] Patent Number: 5,042,933

[45] Date of Patent: Aug. 27, 1991

[54] EYEWEAR CONSTRUCTION

[76] Inventor: David R. Lear, 5725 Bravo Ave., Reno, Nev. 89506

[21] Appl. No.: 276,270

[22] Filed: Nov. 25, 1988

[51] Int. Cl.$^5$ .............................................. G02C 5/14
[52] U.S. Cl. .................................... 351/111; 351/118
[58] Field of Search ................. 351/41, 111, 114, 118, 351/121, 153

[56] References Cited

U.S. PATENT DOCUMENTS

4,461,549 7/1984 Reese et al. .......................... 351/153

Primary Examiner—Paul M. Dzierzynski
Attorney, Agent, or Firm—Poms, Smith, Lande & Rose

[57] ABSTRACT

Eyeglasses and support means for attachment to the wearer's ears, including a pair of lenses attached to a central bridge resting on the wearer's nose, an earpiece for each of the wearer's ears, and supporting flexible filaments interconnecting each lens with the corresponding earpiece. A set of two filaments is provided for each lens, and means are provided in the rear portion of each earpiece for selectively adjusting the effective length of each filament of a set and for locking the end portions of the filaments to maintain the effective lengths constant during normal use of the eyewear.

16 Claims, 6 Drawing Sheets

EYEWEAR CONSTRUCTION

BACKGROUND AND SUMMARY OF THE INVENTION

The present invention relates generally to construction of eyewear, and more particularly to a structure using flexible lines, filaments or cords instead of conventional temples hingedly attached to each of the lenses.

It has previously been proposed to use flexible lines, filaments or cords to connect eyeglass lenses with earpieces in spectacles, and to provide means for adjusting the length of the filaments in order to properly position the eyeglass lenses relative to the wearer's eyes. For example such constructions are shown in the U.S. Pat. No. 4,202,609 to Donald Reese and in U.S. Pat. No. 4,461,549 to Donald Reese et al. In these patents the constructions for adjusting the effective length of the flexible filaments are located at the forward ends of the earpieces, and provide only slight ranges of adjustability of the filament lengths.

The present invention provides an earpiece assembly including an earwire of bendable material such as metallic wire housed in a tubular sleeve member of rubber or equivalent resilient material such as silicone tubing. Also received within each sleeve are the rear portions of a set of two filaments whose forward portions extend forwardly and divergently from the front end of the earpiece to openings formed in one of the lenses. The forward ends of the set of filaments are anchored to the lens close to the outer edge of the lens. Each lens is provided with a pair of openings spaced vertically by approximately 1 inch (25.4 mm), and each opening includes means forming a frusto-conical pocket, with the larger end of the pocket directed forwardly of the lens. This affords an anchoring seat for an enlarged front end of the filament and thereby minimizes the possibility of inadvertent disassembly of the filament from the lens. In each earpiece the rear portion of the earwire projects beyond the rear opening of the sleeve and forms a mandrel or arbor on which the rear lengths of a set of filaments are wound in fixing the effective lengths of the filaments after adjustment. The mandrel portion of the earwire may be provided with a series of notches or serrations to receive the filaments wound thereon. An end cap is attached to the ends of the filaments, and is pressed into frictional engagement with the end portion of the sleeve and the filaments wound on the mandrel.

Accordingly it is a principal object of this invention to disclose an improved eyeglass mounting using flexible filamentary lines in place of temples extending between the eyeglass lenses and the wearer's ears. Other objects of the invention are to provide such a construction including a pair of earpiece assemblies, each comprising a flexible sleeve of silicone or the like for housing an earwire and the rear portions of a set of filaments connected at their forward ends to a lens. A further object is to provide such an assembly in which the rearmost portion of the earwire has wound thereon the rearmost portions of a set of filaments, and the earpiece has a rear end cap frictionally mounted on the wound filaments and sleeve. Other objects will be understood from the following description taken in connection with the accompanying drawings.

DETAILED DESCRIPTION

Figure 1:
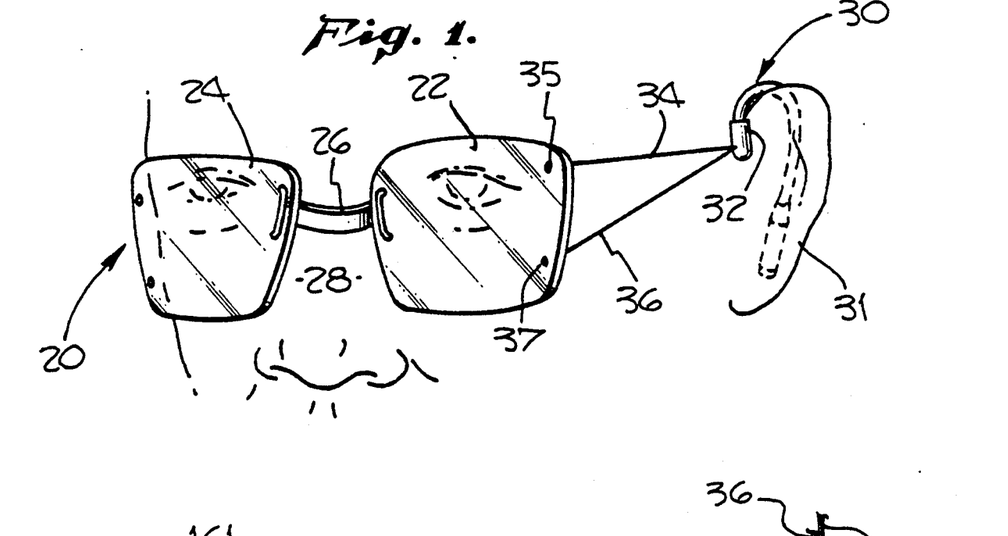
FIG. 1 is a right front perspective view of a pair of eyeglasses and fragmentary portions of the wearer's eyes and left ear, the eyeglasses embodying the present invention.

Referring in detail to the drawings, in FIG. 1 and indicated generally at 20 is a pair of eyeglasses embodying the present invention. Eyeglasses 20 include left and right lenses 22,24, attached to a central bridge 26. The entire structure is symmetrical about a vertical plane disposed centrally of bridge 26, which rests upon the upper portion of the wearer's nose 28.

An earpiece indicated generally at 30 fits on the wearer's left ear 31. From the front end portion 32 of earpiece 30, a set of flexible lines or filaments 34,36 extends forwardly, diverging to vertically spaced line anchor points 35,37 near the outer edge of lens 22. Filaments 34,36 are desirably made of nylon or material of similar characteristics.

Figures 2, 3:
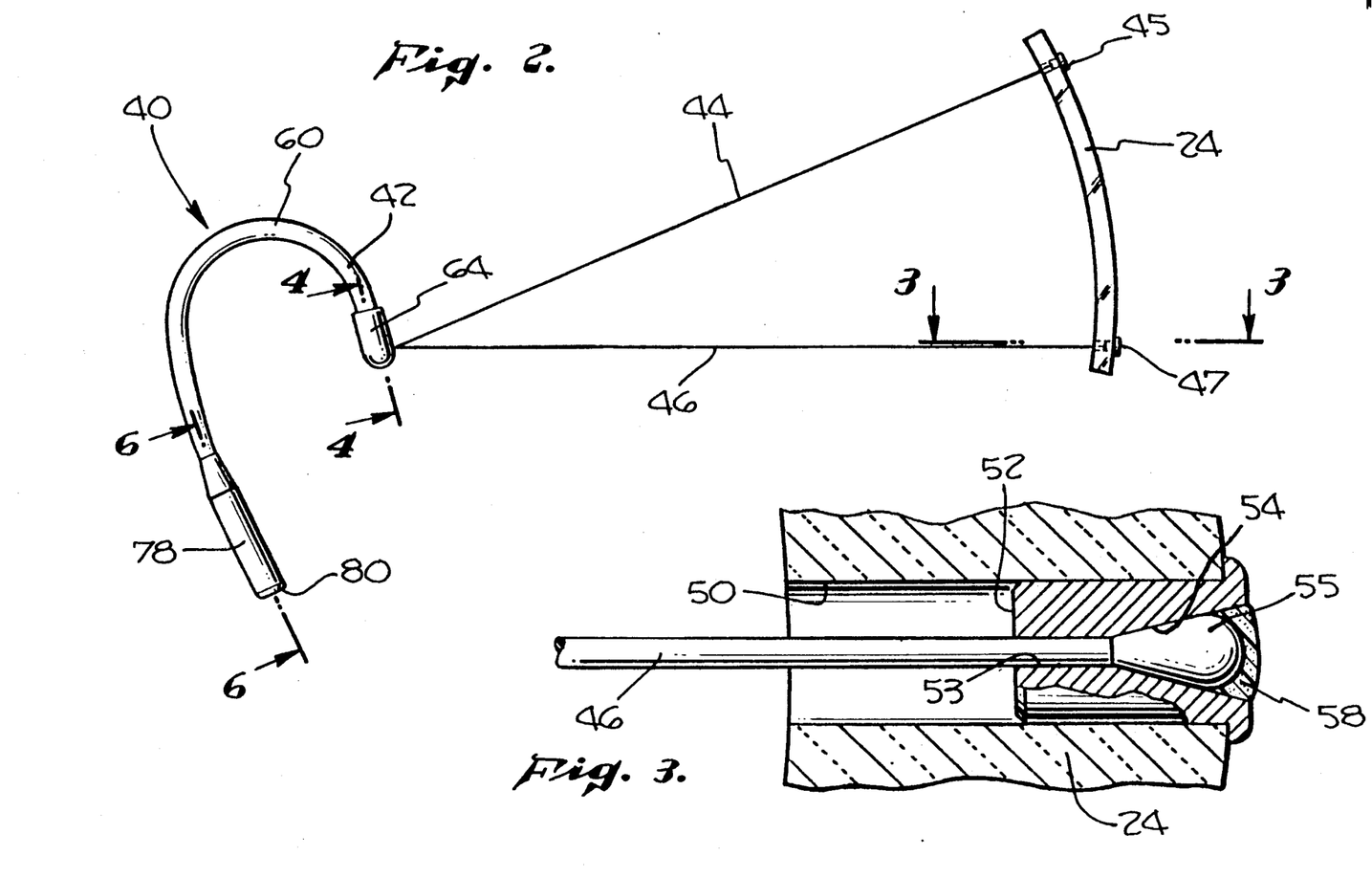
FIG. 2 is a side elevational view of the eyeglasses taken from the wearer's right side, showing an earpiece, a lens and one set of the interconnecting support lines.
FIG. 3 is a sectional view on a greatly enlarged scale taken on the arrows III—III of FIG. 2, showing the preferred anchor construction attaching a line to the lens.

Referring now to FIG. 2, and keeping in mind the symmetry of the present construction, it will be seen that the earpiece 40 for the wearer's right ear (not shown) includes a front portion 42, from which a set of flexible filaments 44,46 extends divergently forwardly to be connected to lens 24 at line anchor points 45,47.

In FIG. 3 is shown a preferred form of construction for anchoring the front end of one of the nylon filaments in a lens. Thus a cylindrical bore 50 extends through lens 24. Snugly seated in the forward end of the bore is a flanged fitting 52 having in its rear portion an opening or tubular bore 53 for receiving filament 46, the bore 53 terminating forwardly in a frustoconical pocket 54 for receiving therein an enlarged bead 55 formed integrally with nylon filament 46. The bead may be formed by heating the filament tip. The parts are retained in assembled relation as seen in FIG. 3 by adhesive 58. The provision of the frustoconical pocket 54 for housing the enlarged bead 55 and opening 53 communicating with the rear portion of the pocket prevents inadvertent disassembly of filament 46 if, for example, the filament is pulled with great force during use. This is to be contrasted with the prior art construction shown in FIG. 14 and described hereinafter.

Figures 4, 5, 6:
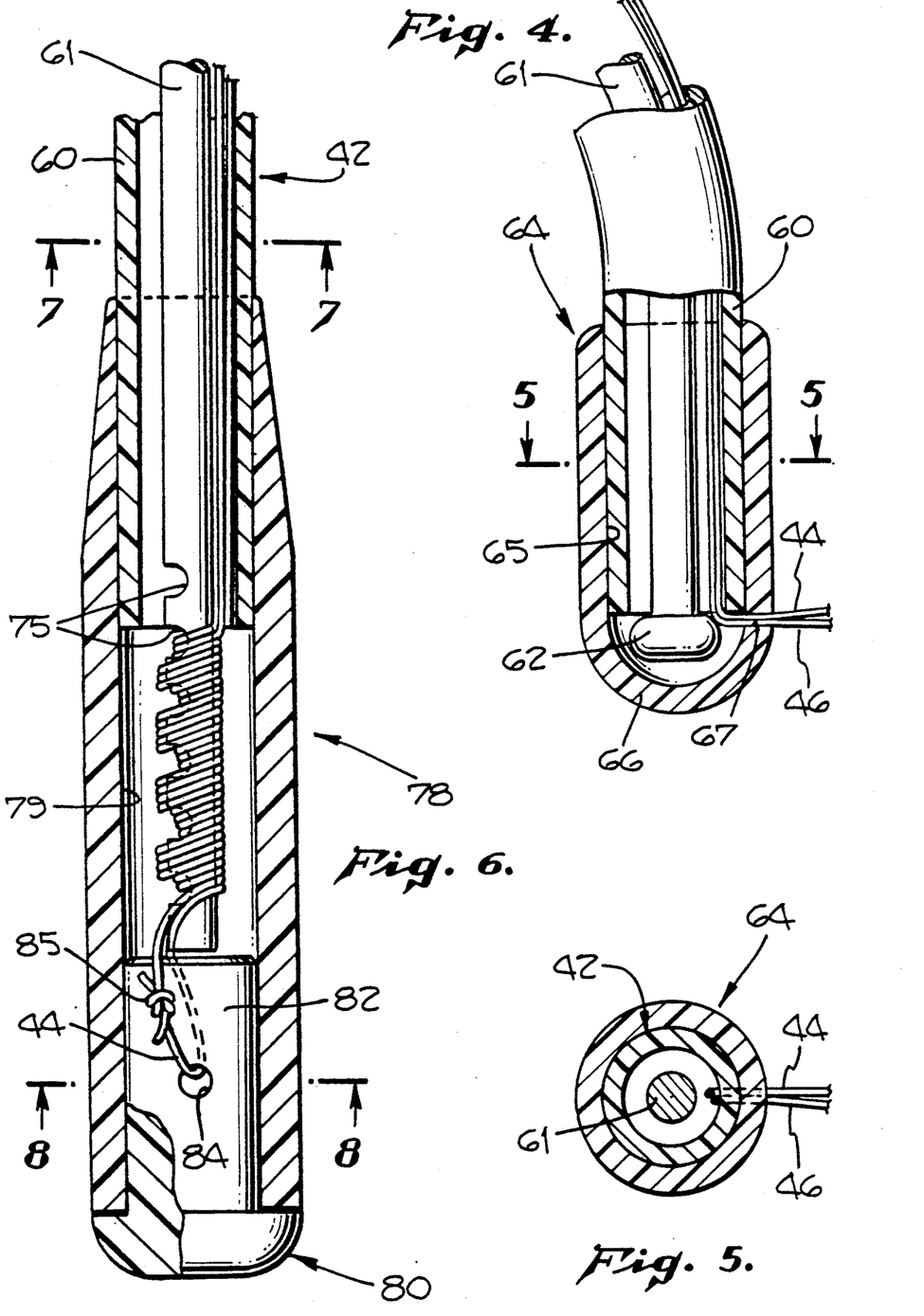
FIG. 4 is a sectional view on a greatly enlarged scale taken on arrows IV—IV of FIG. 2, showing the details of the front end of the earpiece.
FIG. 5 is a sectional view taken on the arrows V—V of FIG. 4.
FIG. 6 is a sectional view on a greatly enlarged scale taken on arrows VI—VI of FIG. 2, showing details of the rear end portion of the earpiece.

The forward portion of the earpiece is shown in FIG. 4. Thus earpiece 40 includes an outer tubular member or sleeve 60 desirably made of silicone or similar flexible material having a smooth surface. Within sleeve 60 and approximately concentric therewith is earwire 61, an elongated member of stiff but bendable material such as metal wire, having at its lower end an enlarged head 62.

Figures 13, 14:
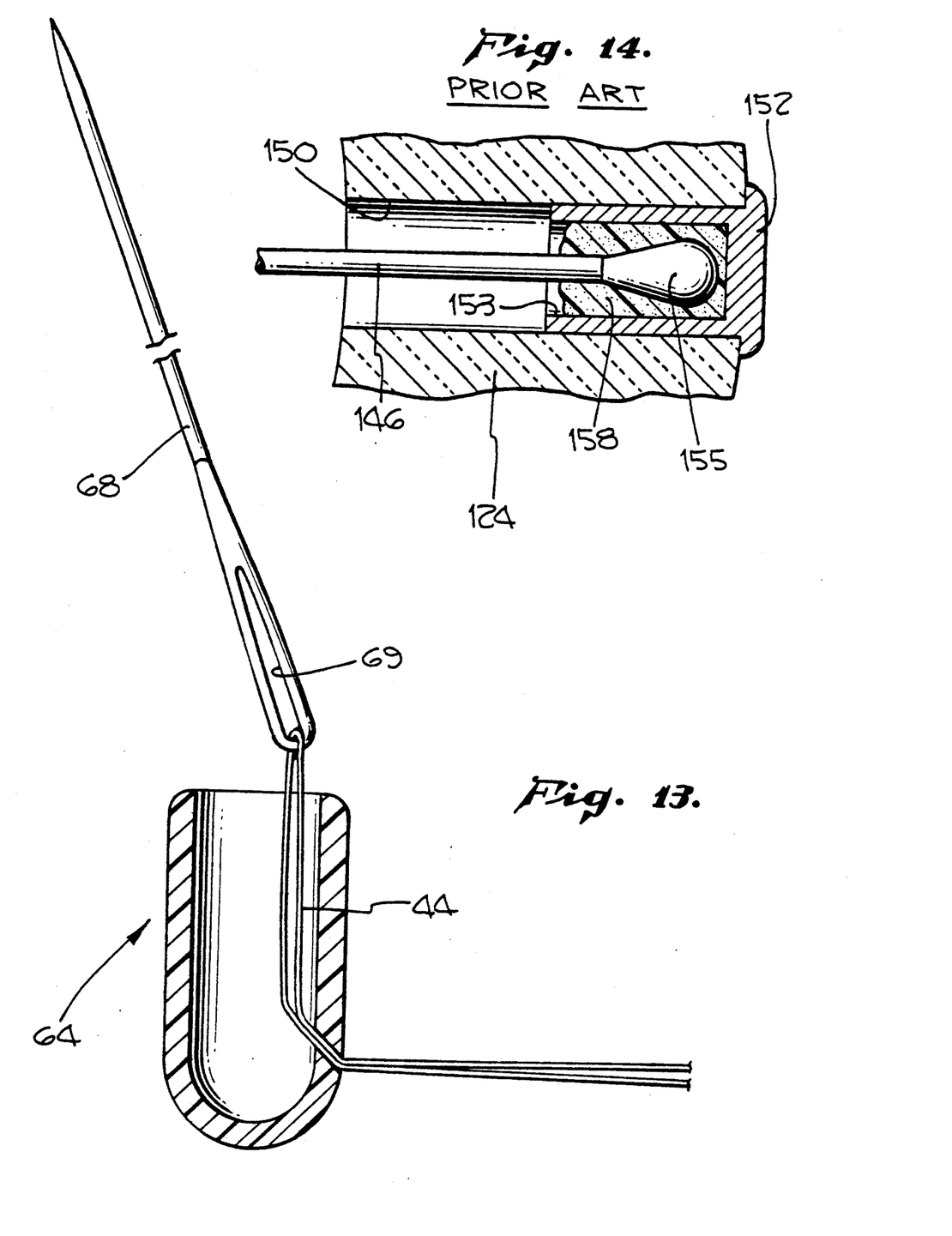
FIG. 13 is a fragmentary sectional view showing the threading of one of the filaments in the lower end of the front end cap, in accordance with an alternative form of the invention.
FIG. 14 is a fragmentary sectional view, similar to FIG. 3, but showing a prior art system for anchoring a line in a lens.

With continued reference to FIG. 4, a front end cap indicated generally at 64 includes a cylindrical side wall 65 in frictional contact with the outer wall of sleeve 60. The cap terminates downwardly in a hemispherical base portion 66 having a lateral opening 67 through which pass filaments 44,46. The filaments continue upwardly as shown in the annular space within sleeve 60 and surrounding earwire 61. An illustrative system for introducing each of the filaments 44,46 into the interior of cap 64 is shown in FIG. 13, illustrating the parts after needle 68, having filament 44 threaded through the needle eye 69, has pierced through the wall of cap 64. The needle with filament 44 still attached, is then threaded through silicone sleeve 60; the other filament 46 is similarly assembled into cap 64 and through sleeve 60.

FIG. 6 shows the details of the rear portion of earpiece 42 when the parts are fully assembled. Thus the lower portion of earwire 61 has formed therein a series of spaced notches, serrations or indentations 75, and the filaments 44,46 are wound around that mandrel portion of the earwire. An elongated tubular end cap indicated generally at 78 has a cylindrical inner wall 79, the upper portion of which is in frictional engagement with the outer surface of sleeve 42 when the parts are assembled as shown. The central portion of wall 79 is in frictional contact with the coil of filaments 44, 46 wound on the earpiece mandrel. The lower end of cap 78 is selectively closable by a closure plug indicated generally at 80. The plug includes an elongated cylindrical shank 82 (compare FIG. 9), which is frictionally received in the lower part of cap 78. The shank includes a transverse bore 84 through which one of the filaments, preferably upper filament 44, extends. The two filaments 44,46 are tied together at knot 85 which provides a means for connecting the filaments 44 and 46.

Figures 7, 8, 9, 10:
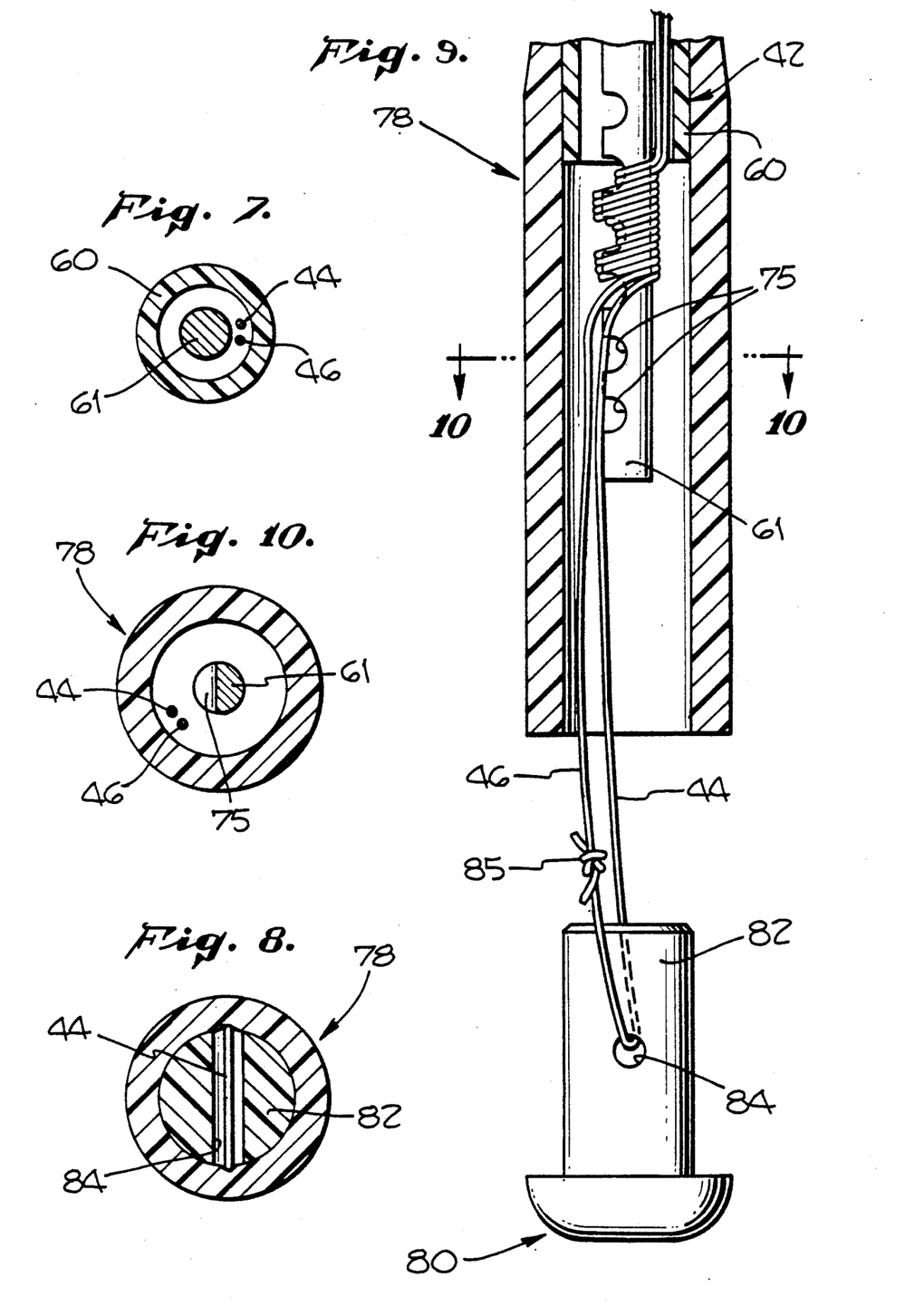
FIGS. 7 and 8 are sectional views taken respectively on arrows VII—VII and VIII—VIII of FIG. 6.
FIG. 9 is a view, partly in section, similar to the lower portion of FIG. 6, except showing the earpiece and lower cap in exploded relation.
FIG. 10 is a sectional view taken on arrows X—X of FIG. 9.

FIG. 9 shows the parts with closure plug 80 not yet assembled into closing relationship with end cap 78. Thus one of the filaments, by convention the upper filament 44, is longer than the other filament, and its end portion is passed through transverse bore 84 of the closure plug.

It will be understood that the parts as shown in FIG. 9 show the relationships after the filaments have been manually adjusted to position the lenses and nosepiece in their desired relationship with the wearer's eyes, the end cap 78 having been disassembled from sleeve 60. With the end cap still disassembled, the end portions of the filaments 44, 46 are then tightly wound on the lower mandrel portion of the earwire, desirably forming a multi-layer coil as shown. The end cap 78 is then slid into frictional assembly on the lower end of sleeve 60 and the coil of the filaments 44, 46. The closure plug 80 is then inserted into the lower end of cap 78 and twisted until the end portions of the filaments 44,46 are tightly wound on the mandrel of earwire 61, as shown in FIG. 6. The fitting of the eyewear on the wearer may be easily adjusted by removing the end cap and closure plug, unwinding the filaments, and then tightening or loosening the filaments as desired. The end portions of the filaments in their newly adjusted positions are wound tightly on the indented portion of the earwire, and the end cap and closure plug replaced into their positions of FIG. 6. Keeping in mind the symmetry of the present mounting, it will be understood that the same procedure applies for the filaments and earpiece on the opposite side.

Figure 11:
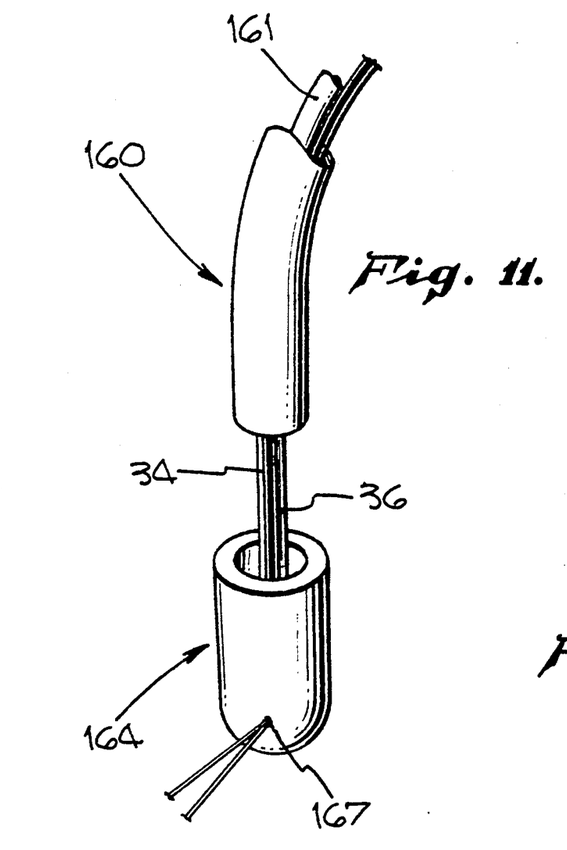
FIG. 11 is an exploded fragmentary view of the front end of the earpiece.
Figure 12:
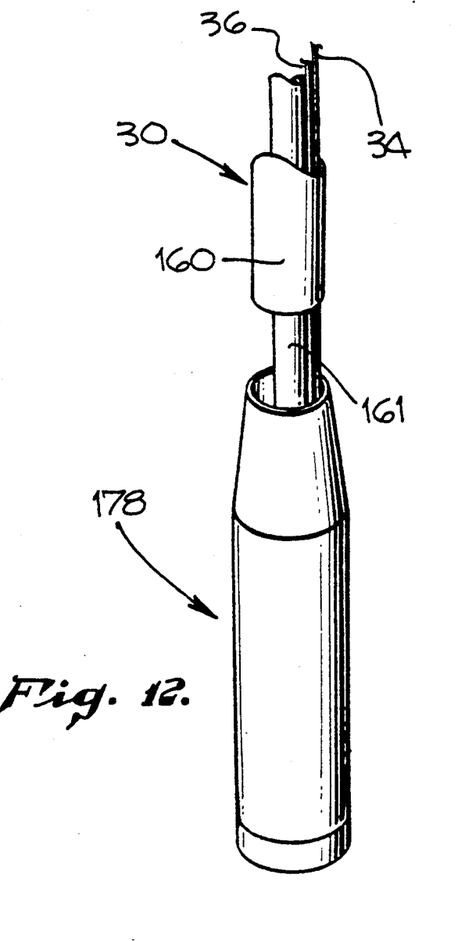
FIG. 12 is an exploded fragmentary view of the rear end of the earpiece.

FIGS. 11 and 12 show in exploded relation the details of the front and rear portions of the earpiece 30, first referred to in connection with the description of FIG. 1. Earpiece 30 includes a sleeve 160 of silicone or the like, identical to sleeve 60 previously described in connection with FIG. 4. Within sleeve 160 are housed earwire 161 and filaments 34,36. Front end cap 164 is frictionally engageable on the forward end portion of sleeve 160, and cap 164 has an opening 167, corresponding to opening 67, for filaments 34,36. In FIG. 12 rear end cap 178 is shown disengaged from its frictional attachment to the lower rear end portion of sleeve 160. The construction corresponds with that shown in FIG. 6.

In FIG. 14 is illustrated a conventional prior art construction of the attachment of a filament to a lens, not embodying the advantageous construction of the present invention as previously described in connection with FIG. 3. As seen in FIG. 14, lens 124 has a cylindrical bore 150 drilled or otherwise formed to extend through the lens. A flanged fitting 152 is seated in the forward end of the lens bore 150, and is provided with a cylindrical counterbore 153. An enlarged integral bead 155 at the forward end of filament 146 is housed in the counterbore 153, and retained therein by adhesive 158. It will be seen that filament 146 and its integral bead 155, along with adhesive 158, can be pulled out of counterbore 153 if excessive tension is inadvertently applied to the filament during adjustment or use of the eyeglasses.

Figure 15:
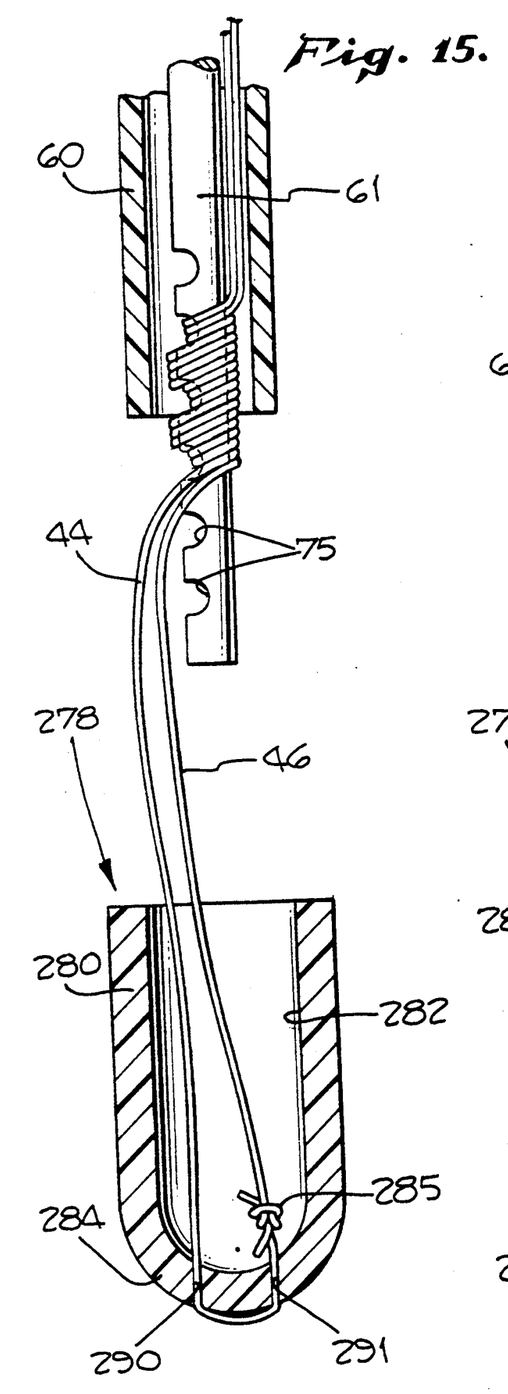
FIG. 15 is a view similar to FIG. 9, showing an alternative form of the rear portion of the earpiece.
Figure 16:
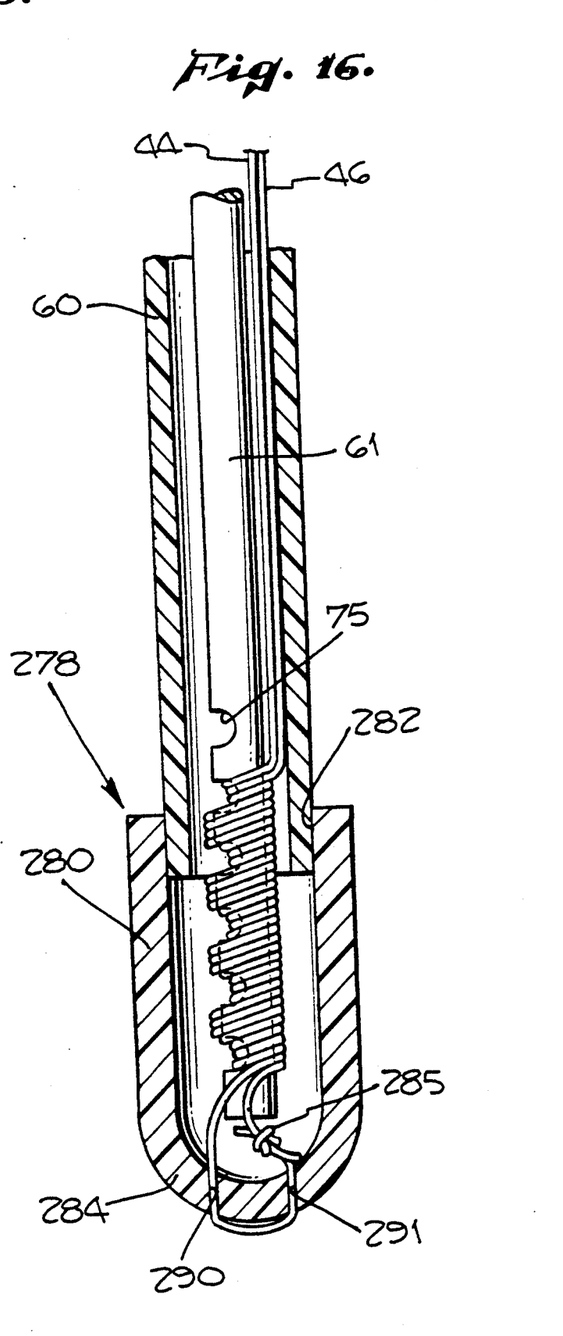
FIG. 16 is a view similar to FIG. 6, but showing the embodiment of FIG. 15 with its parts in closed or assembled relation.

FIGS. 15 and 16 illustrate an alternative embodiment of the invention, particularly in the rear portion of the earpiece. Comparison of FIG. 15 with the earlier described FIG. 9 will show that sleeve 60 and earwire 61 are essentially the same in the two forms of the invention, and that, in FIG. 15, a modified end cap indicated generally at 278 serves in place of the end cap 78 and closure plug 80 shown in FIG. 9. More specifically, end cap 278 includes an upper portion 280 having a cylindrical counterbore 282 and an integrally formed lower hemispherical end wall 284. The end portions of filaments 44,46 extend through eccentrically spaced openings 290,291 formed in the end wall 284, the filaments being tied at knot 285, corresponding to knot 85 previously described in FIGS. 6 and 9. The openings 290,291 in the hemispheric end wall 284 are desirably symmetrically spaced from the center of the hemisphere. Thus, as end cap 278 is twisted into its assembled position of FIG. 16, the lower end portions of the filaments will be twisted around the lower end portion of earwire 61. This forms a preferably multi-layer coil of filaments 44, 46 on the earwire mandrel. The inner wall of end cap 278 is sized to snugly fit in frictional contact with the outer surface of sleeve 60 and the outer surface of the coil of filaments 44, 46 wound on the earwire mandrel Thus end cap 278 serves to retain the parts in assembled relation as seen in FIG. 16.

Minor modifications and changes not substantially departing from the above described illustrative forms of the invention are intended to be embraced within the scope of the following claims:

What is claimed is:

1. Eyewear construction comprising:
   left and right eyeglass lenses and a central bridge attached to the lenses;
   a pair of earpieces, each earpiece being shaped to rest upon and partially encircle the wearer's ear;
   a pair of sets of flexible supporting filaments, each set interconnecting one of said lenses with an associated one of said pair of earpiece;
   fixing means on each of said earpieces associated with each of said filaments for fixing the effective length of a set of the filaments extending between a lens and earpiece;
   a filament storage means associated with each of said earpieces for storing an excess length of each of said filaments which is in excess of that required for said effective length; and
   a readjustment means for subsequent readjustment of said effective length to an extent thereof which is greater than that of said initial extent.

2. The eyewear construction as defined in claim 1 wherein:
   each of said earpieces includes a hollow flexible tubular sleeve having a front portion forwardly of the ear and a rear portion rearwardly of the ear;
   each of said pair of sets of filaments interconnects the associated lens with the forward portion of the sleeve of the associated earpiece; and
   portions of a set of filaments including said excess length of said filaments are housed within each sleeve.

3. The eyewear construction as defined in claim 1 wherein said storage means includes an elongated mandrel on which excess length portions of a set of filaments may be wound.

4. The eyewear construction as defined in claim 3 wherein said readjustment means includes a tubular end cap selectively assemblable in frictional relation on the portions of filaments wound on said mandrel.

5. The eyewear construction as defined in claim 4 in which the tubular end cap includes a portion which, when the cap is assembled on the earpiece, projects into frictional contact with the outer wall of said sleeve.

6. The eyewear construction as defined in claim 4 wherein said readjustment means further comprises a connection between the ends of each pair of filaments of a set which are associated with the storage means and to said end cap to facilitate ease of manipulation of the relative effective length of each of said pair of filaments during adjustments of said effective length of said filaments between the associated lens and earpiece.

7. The eyewear construction as defined in claim 6 wherein said mandrel is provided with a series of indentations spaced therealong.

8. The eyewear construction as defined in claim 3 wherein said mandrel is attached to a bendable metallic wire housed within said sleeve.

9. The eyewear construction as defined in claim 1 wherein:
   the forward ends of the filaments of a set are attached to a lens at vertically spaced anchor points adjacent to the edge of the lens distant from said bridge;
   the forward portion of each of said filaments having an enlarged member which is an integral part of a forward tip of the filament; and
   a flanged fitting at each anchor point having in its rear portion a tubular bore for receiving a filament, the bore terminating forwardly in a frustoconcial pocket for receiving therein the enlarged member formed integrally of the associated filament extending through said bore.

10. In an eyewear construction comprising a pair of lenses joined by a central bridge, a pair of earpieces, a pair of sets of lens supporting flexible filaments, each set including two filaments interconnecting one of said pair of earpieces and a filament fixing means associated with each of said pair of earpieces for fixing each of said two filaments of a set to the associated earpiece when a first length of said filament extending between the associated lens and earpiece has been selectively adjusted to a desired length, there being a second length of each of said filaments engaged by said filament fixing means, the improvement comprising the provision of:
   storage means associated with each of said pair of earpieces for storing a third length of each of the associated two filaments which is in excess of that required for said first and second length; and
   means for connecting ends of the third length of each of said two filaments of a set to each other to facilitate a subsequent adjustment of said first lengths through manipulation of said filaments with their ends connected.

11. The eyewear construction defined in claim 10 wherein:
   the forward ends of the filaments of a set are attached to a lens at vertically spaced anchor points adjacent to the edge of the lens distant from said bridge;
   at each anchor point there is provided means forming an enlarged pocket and, communicating therewith, an opening of restricted size through which the forward portion of a filament extends and is fixed to an enlarged member housed in said pocket; and
   said enlarged member is an integral part of forward tip of the filament extending through the opening.

12. Eyewear construction comprising in combination:
   left and right eyeglass lenses and a central bridge attached to the lenses;
   a pair of earpieces, each earpiece being shaped to rest upon and partially encircle the wearer's ear and including a hollow flexible tubular sleeve having a front portion forwardly of the ear and a rear portion rearwardly of the ear;
   a pair of sets of flexible supporting filaments, each set interconnecting one of said lenses with the forward portion of one of said sleeves and including a pair of such filaments having first ends connected to the associated one of said lenses, first filament portions extending from said one of said lenses to the forward portion of the associated one of said sleeves, second filament portions extending through said one of said sleeves, third filament portions extendible out of a rear portion of said one of said sleeves and second ends connected to each other;

and means at the rear portion of each earpiece including a sleeve end closure member to which said second ends are connected for selectively adjusting and fixing the effective length of the associated set of the filaments.

13. The eyewear construction as defined in claim 12 wherein said adjusting and fixing means includes an elongated mandrel on which said third filament portions of a set of filaments may be wound.

14. The eyewear construction as defined in claim 13 in which the tubular end cap includes a portion which, when the cap is assembled on the earpiece, projects into frictional contact with the outer wall of said sleeve.

15. The eyewear construction as defined in claim 14 wherein said mandrel is attached to a bendable metallic wire housed within said sleeve.

16. The eyewear construction as defined in claim 12 wherein said sleeve end closure member comprises a tubular end cap selectively assembleable in frictional relation on the third filament portions of said set of filaments wound on said mandrel.

* * * * *